Patented May 5, 1936

2,039,808

UNITED STATES PATENT OFFICE 2,039,808

ADHESIVE PAPER AND METHOD OF MAKING THE SAME

Harold Kushel, Brooklyn, N. Y.

No Drawing. Application April 23, 1935,
Serial No. 17,770

4 Claims. (Cl. 91—68)

This invention relates to paper products and has particular reference to gummed paper and methods of making the same.

One object of the invention is to provide a paper product of the character described, which may be exemplified in the so called adhesive tape, and which shall combine a dye therein, and which paper product is inexpensive to manufacture, distinctive in appearance, durable, reliable, and efficient in use.

Another object of the invention is the provision of a paper product which shall combine a dye and a water soluble adhesive, so arranged and coordinated as to require the use of less adhesive and to cause the adhesive, upon being wetted, to harden more rapidly than otherwise possible, while at the same time maintaining the holding power of the adhesive at a high point.

A further object of the invention is to furnish improved methods of making a paper product which shall permit the use of conventional mechanical apparatus, and which shall not increase the cost of the product.

Other objects and advantages of the invention will become apparent as the specification proceeds.

With the aforesaid objects in view, the invention consists in the novel features hereinafter described in their preferred embodiments, and pointed out in the subjoined claims.

The advantages of the invention may be best realized when all of its features are used together, but useful articles may be made using fewer than all features.

It will be obvious to those skilled in the art to which the invention appertains that the same may be used for different products and may be practised by different methods within the principles herein disclosed.

My invention utilizes paper made by the so called "sulphate" and "kraft" processes, in which sulphate of soda is employed as the source of alkali. In the process of reclamation, it is converted into a mixture of carbonate and sulphide, and as the carbonate is inactive in the cooking, it is converted into the active caustic soda by causticizing the "green liquor", which may be a mixture of carbonate, sulphide and sodium sulphate in solution, by the use of lime. The cooking liquor becomes a mixture of caustic soda and sodium sulphide.

I employ as adhesive an animal glue, which may comprise bone and hide glues. The bone glues, intermixed with the hide glues, are used primarily to keep down the expense of using hide glues alone. The glue is preferably used in powdered form so as to dissolve rapidly in water and at relatively low temperatures. After thorough soaking, the glue will dissolve freely at temperatures below 140 degrees F., so as not to affect the paper or the dye, when the glue is being applied to the paper.

I employ aniline dyes or other dyes derived from coal tar dyes, as generally denominated as aniline dyes. The dyes may be acidic or basic. Acid dyes cause an accelerating effect on the rate of solution and a retarding effect on the rate of formation of a gelatine or gelatinous substance, and similar effects on animal and plant fibers. Basic dyes cause opposite actions. I therefore prefer to use acid aniline dyes as they favor permeability as well as rapidity of solution of the glue.

A kraft paper product made according to this invention may have the aniline dye applied to one or another of the surfaces of the sheet of paper, together with a suitable sizing or filling agent, if desired, provided that such agent shall not harden the glue so as to retard its solubility. The surface so treated may be calendared to produce a relatively high finish. The dye will be such as not to run if it becomes subsequently wetted, and it is preferably applied only to the surface of the paper so as to conserve the dye. The dye solution will partially close the pores of the paper, and when the latter is calendared, the pores may become further closed and a smooth glossy colored effect produced on the paper without the utilization of special coating materials or the use of special processes, which render so called "coated paper" rather expensive.

After the paper has been dyed and calendared, I apply the glue to a surface thereof. Thus, I apply a coating of glue on the dyed calendared surface. As a result, I have found not only that less glue is required, but also that the glue, on being softened with water, dries and hardens substantially more rapidly than heretofore. The invention has a particularly useful application to adhesive tape, such as is used to bind paper packages. Such tape frequently slips after being wetted and applied, and must be held down until the glue dries. By this invention, the time for drying is so substantially reduced, that a material advantage is derived.

The rate of drying of the glue appears to be definitely accelerated by the aniline dye, though I am unable to tell for what precise reason. I have found that the time for drying of the glue is materially less than if the aniline were not used.

The paper surface treated as above stated has sufficient pores left for a strong engagement with the glue, to assure a greater holding power than if pores were wholly absent, as in glazed paper.

Thus the advantages of the invention offset the increased cost of the tape paper, which results from the dyeing and calendaring operations.

Any color may of course be used, and advantages are produced according to this invention, regardless whether the dye be applied to the same or to that face of the paper which is opposite to the glue, or to both faces. In any case, the calendaring results in the production of a uniform, finished colored surface with the employment of a minimum quantity of dye, and since the operations of dyeing and calendaring are continuous, the calendaring is inexpensive. The glue side of the paper acquires a highly finished appearance as a result of the dyed, calendared surface under the glue. If it be desired to produce a coated as distinguished from an adhesive paper, a glue having suitable hardening sizing therefor may be applied over the dyed calendared surface.

In course of manufacture, any suitable apparatus may be used for dyeing, calendaring, and applying glue to the paper, and the several operations may be continuous throughout.

If desired, the filler used with the dye may include formaldehyde, which decreases the dispersion of the glue colloid and increases the viscosity and hence the strength of the glue.

As a result of impregnating a surface of the paper with a size containing dye, and then calendaring the surface and subsequently applying the glue thereto, the dye will not penetrate through the paper upon wetting the glue, and the accelerated drying of the glue further aids this result. Hence smudges of dye on the opposite outer surface of the tape are avoided. The effect described may be enhanced by the use of formaldehyde in the glue. The dye may penetrate the wetted glue to thus mark a package to which the tape may be applied and indicate whether the package has been tampered with.

I claim:

1. Adhesive tape kraft paper having only one face coated with a water soluble dye, said face being calendared, and a highly viscous animal glue coating for said face.

2. Kraft paper having one surface treated with a water soluble aniline dye comprising a sizing, the other surface being free of said dye, said surface being calendared to partially close the pores of the dyed surface, and a coating of animal glue for said surface.

3. Kraft paper having one surface only treated with an aniline water soluble dye containing a sizing, said surface being calendared to partially close the pores of dyed surface, and a coating of animal glue comprising formaldehyde for said surface.

4. The method of making colored adhesive paper, which includes dyeing one surface only with an aniline dye having a sizing, then calendaring said surface, and finally applying a highly viscous animal glue to said surface.

HAROLD KUSHEL.